G. E. NEUBERTH.
LEG MOUNT CASTER.
APPLICATION FILED JAN. 15, 1909.

934,005.  Patented Sept. 14, 1909.

Witnesses:
C. P. La Gay
E. Van Zandt

George E. Neuberth Inventor
By his Attorneys
Burney, Mastick & Ogden

UNITED STATES PATENT OFFICE.

GEORGE E. NEUBERTH, OF NEWARK, NEW JERSEY, ASSIGNOR TO UNIVERSAL CASTER & FOUNDRY COMPANY, A CORPORATION OF NEW JERSEY.

LEG-MOUNT CASTER.

934,005.  Specification of Letters Patent.  Patented Sept. 14, 1909.

Application filed January 15, 1909. Serial No. 472,496.

*To all whom it may concern:*

Be it known that I, GEORGE E. NEUBERTH, a citizen of the United States, residing at Newark, New Jersey, have invented certain new and useful Improvements in Leg-Mount Casters, (Case 4,) of which the following is a specification, illustrated by drawings.

The invention was primarily made for brass and iron bedsteads having hollow legs, but it is not limited thereto by its principles of operation. The forces at work in casters of this sort are analyzed to some extent authoritatively in the circuit court opinion in Universal Caster & Foundry Company against M. B. Schenck Company, reported in *Federal Reporter*, and it will not be necessary to review them in detail.

For hollow metal legs it has long been customary to have a terminal ornamental enlargement or foot mount immediately above the caster. Several inventions, my own among others, are in use or known for combining a leg mount with a caster for hollow legs, it being common to support the pintle, partially at least, against the interior of the leg by various special means.

The present invention concerns primarily the leg mount, which, in the preferred form of the invention is the sole and direct means of securing the caster jaws and bearings to the leg mount, of supporting the leg, and of centering and holding in proper relationship to each other the vertical axis of the caster and the vertical axis of the leg.

A single preferred embodiment of the invention is shown in the accompanying drawings. From this it will be apparent that some of the features may be omitted with their individual functions without destroying the utility of the caster as a whole though impairing pro tanto its mechanical perfection.

Figure 1:
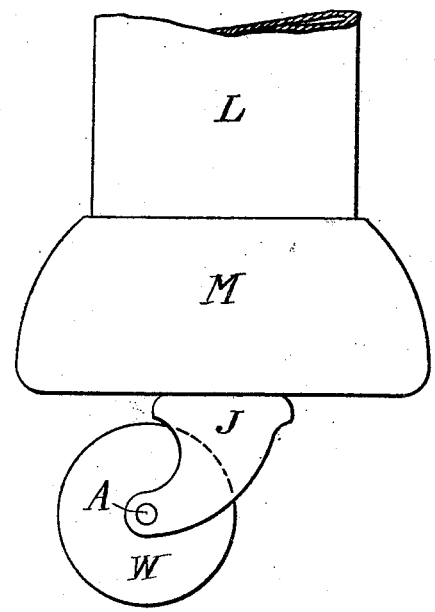
Figure 2:
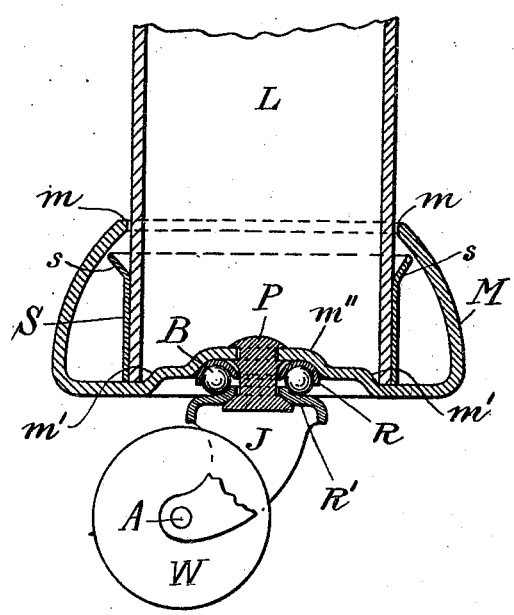
Figure 3:
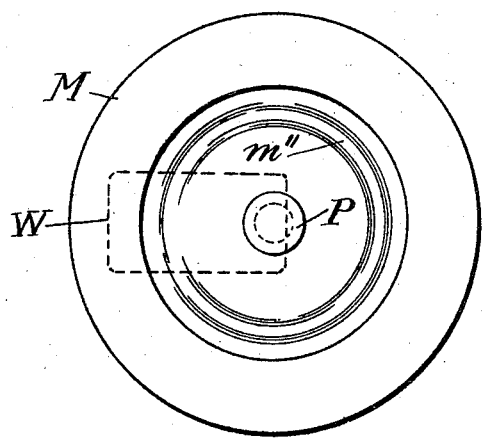
Figure 4:
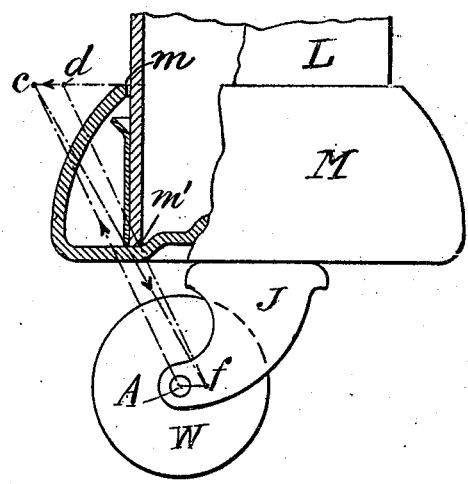

In the drawings Figure 1 is a side elevation, Fig. 2 a central vertical section, and Fig. 3 a plan view of the combined leg mount and caster. Fig. 4 is a diagram of some of the forces at work when the leg and caster are subjected to combined weight and side thrust.

The parts will be readily recognized and are lettered as follows: Leg L, leg mount M, spring retaining means therefor S, bearing balls B, pin or rivet P, caster jaws J, wheel W. The horizontal axis of the wheel W is lettered A. The leg mount M is preferably of very simple design. It enlarges downward from its point of contact with the exterior of the leg at $m$ through a graceful curve, turning inward at its base, as shown, and forming an inclining shoulder $m'$ which serves additionally to center the extreme end of the leg. At $m''$ it is dished to afford a ball race, and, if desired, a separate ball race R may be inserted over the balls B. The pin P is preferably riveted rigidly at the axis of the leg mount and the jaws J swiveled upon the pin, the shoulders or enlarged head at the lower end of the pin serving to retain the jaws and the ball bearings in place. The jaws are shown shaped to form the lower ball race, though obviously a separate race may be inserted. The split spring-retaining ring S is flared at its upper margin for two reasons: Firstly, the flared portion prevents the spring ring from dropping out of the leg mount when the leg mount is separate from the leg; and secondly, the flare provides a cam surface so that when the leg is thrust in the leg mount it will expand the spring and pass freely in, causing the spring to thereupon bind upon it and hold the caster to the leg.

It will be seen that primarily the weight of the leg and its load act axially downward and are resisted by the upward supporting force transmitted to the jaws from the axle or axis of the wheel W. Horizontal forces are produced by the dragging or movement of the leg and caster upon the usual carpet or other friction-producing surface on the floor. In addition to this last force, which results in a tilting moment in a vertical plane, there is a tilting moment acting in the same rotational sense by the eccentric position of the axis A from the vertical axis of the entire system whenever the horizontal movement of the leg causes the jaws to point in the reverse direction to that motion. Such is the case when the jaws turn freely on their ball bearings during a rectilinear motion of the bedstead or other article of furniture.

It will be seen from Fig. 4 that the forces acting upward through the axis of the wheel at A may act in a line that passes within or without the extreme lower end of the periphery of the leg. In the latter case only will there be any considerable tendency to tip the leg mount, and the force is so illustrated in Fig. 4. Such a tilting of the leg mount tends to occur primarily upon the lower end of the leg near the point $m'$ in Fig. 4 and the leg mount tends to slide to the left. If the shoulder $m'$ is present, as illustrated in all the figures, such sliding cannot occur and consequently the tilting is checked by the uppermost point of contact of the leg mount at $m$ against the smooth exterior surface of the leg. Neglecting friction, the force exerted on the leg mount at the point $m$ is normal to the surface of the leg and along the horizontal line shown in Fig. 4 leading from that point. As the forces along the line A $c$ and $m$ $c$ intersect at the point $c$ the third line of force through the contact between the shoulder $m'$ and the leg must act upon the leg mount in the direction along the line $c$ $m'$. With the shoulder $m'$ present, therefore, if the length A $c$ represents the force A $c$ by completing the parallelogram we have the amounts as well as the directions of the three forces represented by the lines A $c$, $d$ $c$ and $c$ $f$ respectively. From this it will be evident that the shoulder at $m'$ may be formed by a conical surface which need be only steep enough to be normal to the line $c$ $f$ to insure the proper centering of the leg mount notwithstanding considerable variation and irregularity in the interior margin of the foot of the leg. With the shoulder $m'$ absent, however, assuming that the force A $c$ acts through a line falling outside the foot of the leg, slipping will occur and the leg mount tend to tilt about the point $m$ of Fig. 4 as a center until the other side of the leg mount swings downward into contact with the leg surface and stops the tilting. Under such conditions, therefore, the leg mount should nearly accurately fit the exterior of the leg and the vertical distance between the points $m$ $m'$ should be considerable and preferably at least equal to or greater than the eccentricity of the axis A as measured from the vertical axis of the leg and system. More usually, however, owing to the small amount of friction produced by a proper construction of caster wheel and by the ball bearings upon which the caster swivels, tilting will not occur because the force A $c$ will be directed inside of the lower extremity of the leg. In such case, in the absence of a shoulder at $m'$ the leg can slip upon the leg mount only to the extent necessary to bring it into contact with the side of the leg mount that is toward the direction of the motion of the leg.

While it is possible and practical to use an interior spring frame and a long pintle, as is very common in casters for tubular legs, it will be seen that by the present invention no such expense or complication is necessary, as the leg mount is self-supporting and self-centering in respect to the leg and by it and its attachments the whole system is centered and kept in place in respect to the leg.

I claim and desire to secure the following:

1. A combined leg mount and caster providing a hollow leg mount upon which the caster is directly supported without coöperation between its parts and the interior surfaces of the leg, and having frictional securing means separate from said leg mount.

2. A combined leg mount and caster providing a hollow leg mount upon which the caster is directly supported without coöperation between its parts and the interior surfaces of the leg, said leg mount having means for engaging the inner edge of the leg end for the purposes set forth.

3. A combined leg mount and caster providing a hollow leg mount upon which the caster is directly supported without coöperation between its parts and the interior surfaces of the leg, said leg mount having a spring-holding means concealed within it and exterior to the leg.

4. A combined leg mount and caster providing a hollow leg mount upon which the caster is directly supported without coöperation between its parts and the interior surfaces of the leg, said leg mount having a spring-holding means for engaging the leg mount and the leg when upon the leg.

5. A combined leg mount and caster providing a hollow leg mount upon which the caster is directly supported without coöperation between its parts and the interior surfaces of the leg, said leg mount having means engaging the inner edge of the leg end for the purposes set forth, said leg mount having a spring holding means concealed within it and exterior to the leg.

6. A combined caster and leg mount in which the caster jaws are swiveled or secured directly to the leg mount and in which the leg mount extends upward and is centered upon the exterior surface of the leg at a distance measured upward from the foot of the leg which substantially equals or exceeds the eccentricity of the caster wheel axis, said leg mount having means engaging the inner edge of the leg-end for preventing side-slip of the leg upon the leg mount.

7. A combined caster and leg mount in which the caster jaws are swiveled or secured directly to the leg mount and in which the leg mount extends upward and is centered upon the exterior surface of the leg at a distance measured upward from the foot of the leg which substantially equals or exceeds the eccentricity of the caster wheel axis, said leg mount having means engaging the inner edge of the leg-end for preventing side-slip of the leg upon the leg mount and also having means for frictionally engaging the cylindrical leg surface and holding the caster to the leg.

8. A combined caster and leg mount in which the caster jaws are swiveled or secured directly to the leg mount and in which the leg mount extends upward and is centered upon the exterior surface of the leg at a distance measured upward from the foot of the leg which substantially equals or exceeds the eccentricity of the caster wheel axis, and a spring holder within the leg mount embracing the leg when in place.

9. A combined leg mount and caster providing a leg mount adapted to surround and be centered upon the exterior of the leg but enlarging downward from its point or points of contact with the exterior of the leg, leaving a hollow or space between it and the leg, a caster swiveled to and supported on the leg mount, and spring means for directly securing the leg mount to the leg.

10. A combined leg mount and caster providing a leg mount adapted to surround and be centered upon the exterior of the leg but enlarging downward from its point or points of contact with the exterior of the leg, leaving a hollow or space between it and the leg, a caster swiveled to and supported on the leg mount, and spring means for directly securing the leg mount to the leg, said spring means being within the said hollow or space.

11. A combined leg mount and caster providing a leg mount adapted to surround and be centered upon the exterior of the leg but enlarging downward from its point or points of contact with the exterior of the leg, leaving a hollow or space between it and the leg, a caster swiveled to and supported on the leg mount, and spring means for directly securing the leg mount to the leg, said spring means being loose within the said leg mount.

In testimony whereof I have signed this specification in the presence of two subscribing witnesses; January 11th 1909.

GEORGE E. NEUBERTH.

Witnesses:
  E. Van Zandt,
  M. M. Riemann.